(12) United States Patent
Wong

(10) Patent No.: US 9,352,855 B2
(45) Date of Patent: May 31, 2016

(54) HEAT GENERATING TRANSFER ORBIT SHIELD

(71) Applicant: Lockheed Martin Corporation, Bethesda, MD (US)

(72) Inventor: Hamilton Wong, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 93 days.

(21) Appl. No.: 14/197,033

(22) Filed: Mar. 4, 2014

(65) Prior Publication Data

US 2014/0299714 A1    Oct. 9, 2014

Related U.S. Application Data

(60) Provisional application No. 61/810,225, filed on Apr. 9, 2013.

(51) Int. Cl.
  *B64G 1/50* (2006.01)
  *B64G 1/44* (2006.01)
  *B64G 1/22* (2006.01)

(52) U.S. Cl.
  CPC .. *B64G 1/44* (2013.01); *B64G 1/50* (2013.01); *B64G 1/503* (2013.01); *B64G 1/222* (2013.01)

(58) Field of Classification Search
  CPC ............ B64G 1/58; B64G 1/503; B64G 1/50; B64G 1/44; F28D 2021/0021
  USPC ............................................ 244/171.8, 159.1
  See application file for complete search history.

(56) References Cited

U.S. PATENT DOCUMENTS

| | | | | |
|---|---|---|---|---|
| 3,653,942 A | * | 4/1972 | Boebel et al. | 244/171.8 |
| 3,768,754 A | * | 10/1973 | Janes | 244/171.8 |
| 3,817,320 A | * | 6/1974 | Williams | 165/47 |
| 5,372,183 A | * | 12/1994 | Strickberger | 165/41 |
| 5,806,800 A | * | 9/1998 | Caplin | 244/171.8 |
| 5,927,654 A | * | 7/1999 | Foley et al. | 244/172.6 |
| 6,073,887 A | * | 6/2000 | Hosick | 244/171.8 |
| 6,073,888 A | * | 6/2000 | Gelon et al. | 244/171.8 |
| 6,102,339 A | * | 8/2000 | Wu et al. | 244/171.8 |
| 6,394,395 B1 | * | 5/2002 | Poturalski et al. | 244/172.7 |
| 7,874,520 B2 | * | 1/2011 | McKinnon et al. | 244/171.8 |
| 8,714,492 B2 | * | 5/2014 | Goodzeit et al. | 244/171.8 |
| 8,967,547 B2 | * | 3/2015 | Wong et al. | 244/171.8 |
| 9,038,960 B2 | * | 5/2015 | Flemin et al. | 244/171.7 |
| 2005/0263648 A1 | * | 12/2005 | Wehner et al. | 244/168 |
| 2007/0221787 A1 | * | 9/2007 | McKinnon et al. | 244/171.8 |

(Continued)

FOREIGN PATENT DOCUMENTS

FR        2681041 A1 *  3/1993  ............... B64G 1/50
WO   WO 2014168923 A2 * 10/2014 ............... B64G 1/58

*Primary Examiner* — Benjamin P Lee
(74) *Attorney, Agent, or Firm* — McDermott Will & Emery LLP

(57) ABSTRACT

A system and apparatus are provided for preventing heat loss in a spacecraft during the upper stage launch phase and transfer orbit. A thermal control panel can be provided that can be positioned adjacent to exposed areas of radiator panels on the spacecraft in a collapsed configuration. The outer surface of the panel can have a high absorptivity, and the inner surface can have a high emissivity. During upper stage launch phase and transfer orbit, the panel can tend to emit heat toward the radiator panels on an inboard side of the spacecraft, thus reducing heat loss from the radiator panels to reduce the need for onboard electronic heaters and thereby preserve battery power for other onboard systems.

20 Claims, 6 Drawing Sheets

(56) References Cited

U.S. PATENT DOCUMENTS

| | | | |
|---|---|---|---|
| 2008/0220262 A1* | 9/2008 | Plotto | 428/432 |
| 2008/0277532 A1* | 11/2008 | Wong | 244/171.8 |
| 2010/0086729 A1* | 4/2010 | Long | 428/116 |
| 2014/0224939 A1* | 8/2014 | Wong et al. | 244/171.8 |

* cited by examiner

HEAT GENERATING TRANSFER ORBIT SHIELD

CROSS-REFERENCE TO RELATED APPLICATIONS

This application claims the priority benefit of U.S. Patent Application No. 61/810,225, filed on Apr. 9, 2013, the entirety of which is incorporated herein by reference.

STATEMENT REGARDING FEDERALLY SPONSORED RESEARCH OR DEVELOPMENT

Not applicable.

FIELD OF THE INVENTIONS

The present inventions generally relate to spacecraft heating control systems and, in particular, to thermal insulative components for use during upper stage launch phase and transfer orbit.

BACKGROUND

Spacecraft heating requirements can cause geosynchronous spacecraft battery depletion during the upper stage launch phase and transfer orbit when the spacecraft solar components are in a collapsed configuration. If the batteries become too depleted to power other critical systems, the spacecraft may be lost.

In order to prevent this outcome, many spacecraft employ thermal shields or produce some solar electrical energy to power onboard heaters while the solar array is in the collapsed configuration. For those spacecraft using thermal shields, such configurations reduce radiative heat loss by attaching thermal shields to the spacecraft solar array or radiator panels. Solar energy generation in the collapsed configuration is performed by facing a stowed solar array panel in the outboard direction, thereby allowing the panel to collect solar energy.

Notably, the thermal shields are costly and add to the weight of the spacecraft without collecting solar energy for heating of the spacecraft. In addition, solar energy generation in the collapsed configuration is only possible for spacecraft using rigid solar panel arrays. Therefore, not all spacecraft can efficiently employ thermal shields, and not all solar panel arrays can be configured to generate solar energy while in the collapsed configuration.

SUMMARY

According to an aspect of some embodiments disclosed herein is the realization that a spacecraft that has a flexible solar array, which is an array that is fully enclosed and unable to generate solar energy while in the collapsed configuration, can incorporate a thermal control system that does not have the drawbacks of traditional thermal shields. Further, the thermal control system can also effectively minimize heat loss in spacecraft applications other than those that use a flexible solar array.

In some embodiments, a spacecraft is provided that can comprise a side, an extensible member and a thermal control panel. The spacecraft side can comprise an exposed area capable of permitting heat transfer between the spacecraft and the ambient environment, e.g., deep space. The extensible member can be coupled to the spacecraft, for example, with a boom or truss. The extensible member can be movable between a collapsed position in which a free end of the extensible member is positioned adjacent to the exposed area at a first distance and an extended position in which the free end is spaced apart from the exposed area at a second distance, greater than the first distance. The thermal control panel can comprise first and second sides. The first side can have an emissivity that is less than the emissivity of the second side. For example, the first side can have an emissivity that is substantially less than the emissivity of the second side. Further, the first side can have an emissivity that is less than the spacecraft side, thereby minimizing heat loss from the spacecraft side when in the collapsed position. The panel can be coupled to the extensible member free end. Further, in the collapsed position, the panel can be configured to absorb incident solar energy and emit heat toward the exposed area thereby adding heat to the spacecraft side and minimizing or eliminating heater usage from the spacecraft batteries. In the collapsed position, the panel can also restrict heat loss from the panel to the environment, e.g., deep space. Additionally, in the extended position, heat transfer from the spacecraft side to deep space can tend not to be substantially restricted by the view factor blockage of the panel.

The spacecraft extensible member can be coupled to the spacecraft side. The spacecraft extensible member can comprise or be coupled to a solar array, such as an extensible flexible solar array. The solar array can comprise a top panel having inner and outer surfaces. The inner surface can comprise at least one solar cell. The panel can be coupled to the outer surface.

The spacecraft can also comprise a solar device, such as a solar array. In the collapsed configuration, solar cells of the solar device may not be exposed to ambient light. The solar device can be coupled to the spacecraft side adjacent to the exposed area. The solar device can comprise an extensible flexible solar array coupled to the spacecraft side, the thermal control panel being coupled to an outer surface of a top panel of the solar array.

In some embodiments, in the collapsed position, the thermal control panel second side can face toward the exposed area. Further, in the extended position, the thermal control panel second side can face away from the exposed area. The panel can comprise a periphery substantially equal in size to a periphery of the exposed area. The panel can comprise a substantially planar body. Additionally, in the collapsed position, the panel can be positioned substantially parallel relative to the exposed area, and in the extended position, the panel can be positioned substantially orthogonally relative to the exposed area.

Some embodiments can also be configured to provide a system for minimizing heat loss of a spacecraft in which the system comprises an extensible member and a panel. The extensible member can have first and second ends. The extensible member can be movable between a collapsed position in which the first and second ends are spaced apart at a first distance and an extended position in which the first and second ends are spaced apart at a second distance, greater than the first distance. The panel can be attached to the first end and comprise a panel body having first and second sides. The first side can have an emissivity lower than an emissivity of the second side. The panel can be movable from the collapsed position toward the extended position such that the panel is spaced apart from the extensible member second end.

The extensible member can comprise at least one extensible solar array. The solar array can comprise a top panel having an outer surface and an inner surface. The inner surface can comprise at least one solar cell. In some embodiments, the panel can be attached to the top panel outer surface.

Some embodiments can also provide for a thermal control panel for a spacecraft. These can comprise a panel body comprising first and second sides and a coupling region on the second side for coupling the panel to a spacecraft. In some embodiments, the first side, which can be an outboard-facing side, can have an absorptivity of at least 0.50 and an emissivity of less than 0.20. In some embodiments, for the first side, the ratio of absorbtance to emissivity can be at least 3.0. In some embodiments, the second side, which can be an inboard-facing side, can have an absorptivity of at least 0.8 and an emissivity of at least 0.8.

The panel body can comprise black Kapton, titanium foil, or a material deposited on the first side or second side. The material deposited can comprise nickel, titanium, or paint, such as black paint. The first or second side can comprise a chemical conversion coating.

The panel body can comprise at least two materials. The first side can comprise bare titanium, anodized titanium, bare beryllium, and/or chromate black nickel. The second side can comprise black paint, Kapton tape, Kapton film, and/or a chemical conversion coating.

The panel can further comprise a coupling mechanism attached to the coupling region. The panel can comprise a periphery that is substantially rectangular.

A method of controlling heat transfer from a spacecraft can also be provided. The method can comprise: positioning a thermal control panel adjacent to an exposed area of a spacecraft; and moving the panel from a first position in which the panel is spaced apart from the exposed area at a first distance, to a second position in which the panel is spaced apart from the exposed area at a second distance, greater than the first distance, wherein in the first position, heat loss from the spacecraft is restricted by the panel and in the second position, heat loss from the spacecraft is unrestricted by the panel. The moving can comprise moving an extensible member. The extensible member can comprise a flexible solar array, and the moving can further comprise moving the flexible solar array from a collapsed position to an expanded position to expose solar cells of the array.

Some embodiments can be provided that comprise a spacecraft having one or more radiator panels positioned proximate to one or more deployable solar arrays. The one or more solar arrays can be configured to be deployed outward from the spacecraft from an undeployed position to a deployed position. The apparatus can comprise one or more thermal control panels operably connected to the one or more solar arrays and configured to cover an exposed area of the one or more radiator panels when the one or more solar arrays are in the collapsed or undeployed position. Each thermal control panel can comprise an outboard surface and an inboard surface. The outboard surface can comprise a high solar energy absorbing material, and the inboard surface can comprise a material having a higher emissivity than the outboard surface. In this regard, when each panel is in the undeployed position and exposed to sunlight, the panel can absorb an amount of the sunlight and emit or radiate heat inboard toward an underlying radiator panel to reduce or eliminate battery heater draw while simultaneously restricting or minimizing heat loss from the underlying radiator panel due to the low emissivity of the outboard surface of the thermal control panel.

According to some embodiments, the thermal control panel can radiate sufficient heat (e.g., 3000-4000 watts) toward the spacecraft radiator panels such that the spacecraft is not required to use onboard heating systems, thus avoiding the battery electrical drain associated with such heating systems.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the inventions as claimed.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
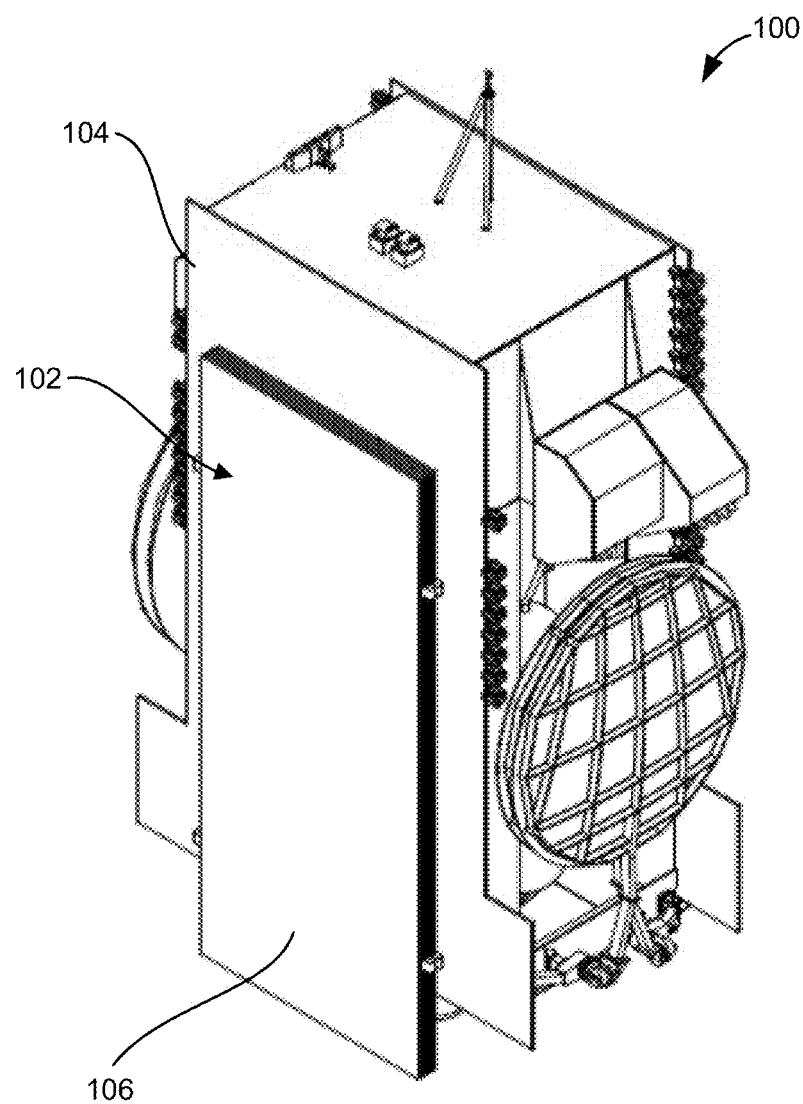
FIG. 1 is a perspective view of a conventional spacecraft having a rigid solar panel array.
Figure 2:
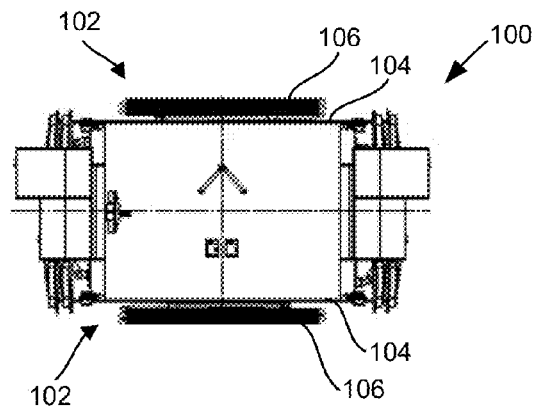
FIG. 2 is a top view of the spacecraft of FIG. 1.
Figure 3:
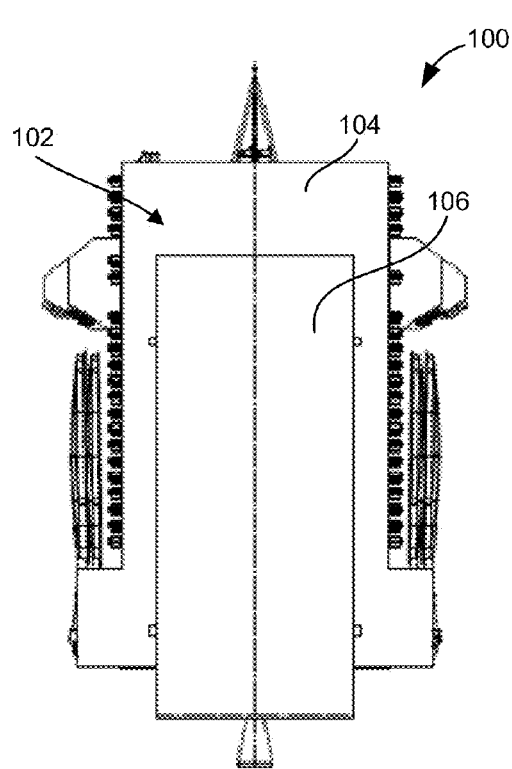
FIG. 3 is a side view of the spacecraft of FIG. 1.
Figure 4:
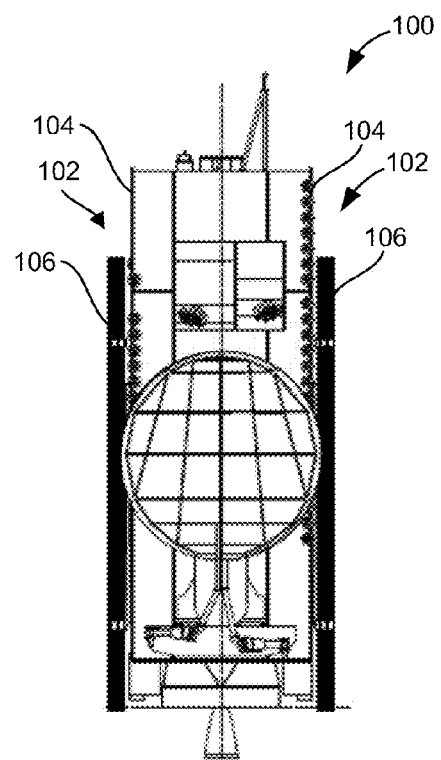
FIG. 4 is an end view of the spacecraft of FIG. 1.
Figure 5:
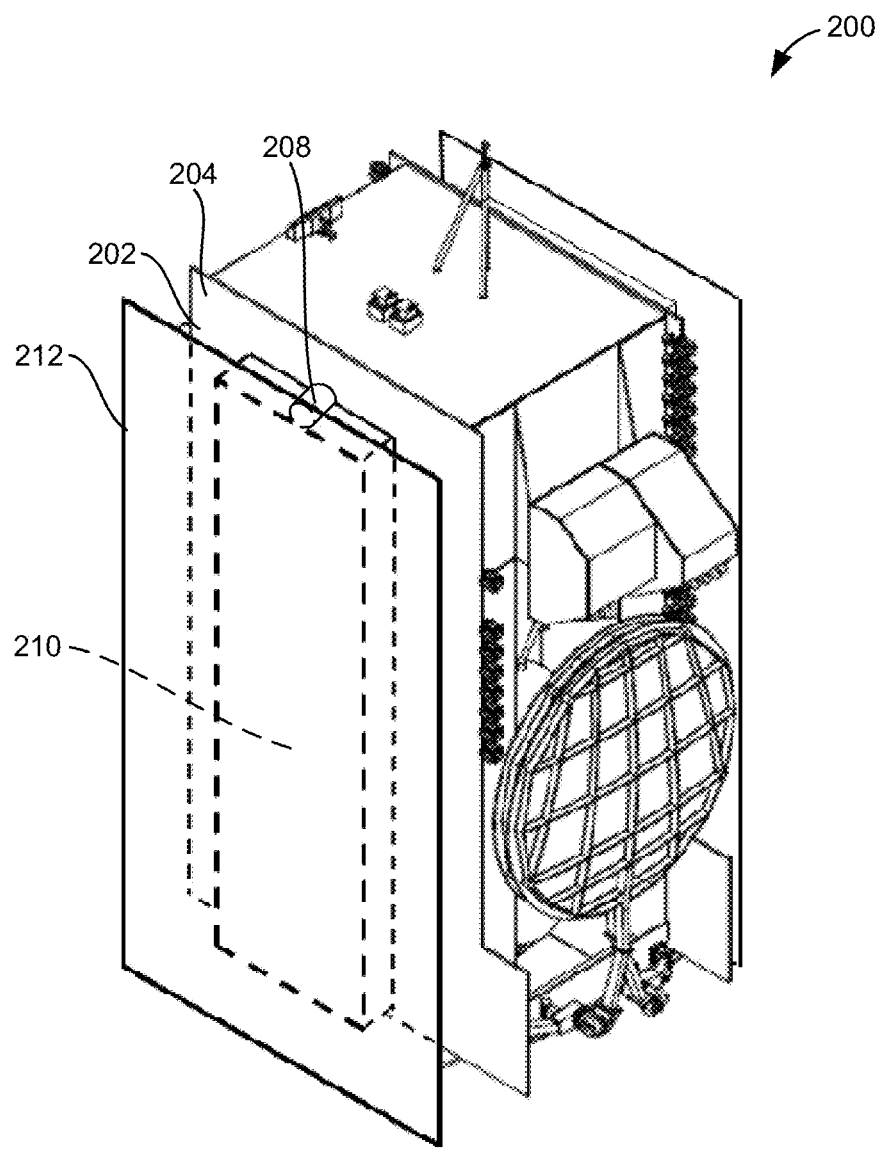
FIG. 5 is a perspective view of a spacecraft having flexible solar panel arrays and thermal control panels in a collapsed configuration, according to some embodiments.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

During the launch and early orbit phase, control and communication with the spacecraft require battery power in order to ensure that a satellite is safely positioned in its final orbit. In addition, during the transfer orbit phase, the spacecraft components, such as the bus section, should be maintained at a temperature above −20° C. in order to enable their full functionality while also maintaining non-operating components above their minimum survival temperature. Due to heat loss from the spacecraft, battery power and/or thermal panels are necessary to generate or maintain a threshold temperature for the spacecraft. Both of these options have limitations and consequences to their use.

For example, FIGS. 1-4 illustrate a general, traditional spacecraft 100 in a configuration for the transfer orbit phase of satellite insertion into a 22,000 mile geosynchronous orbit altitude. The spacecraft 100 comprises a pair of rigid solar arrays 102 in a stowed configuration and a pair of radiator panels 104 on opposing sides of the spacecraft 100. Each radiator panel 104 extends along a side of the spacecraft 100, and heat loss occurs primarily through these radiator panels 104. During the transfer orbit phase or prior to expansion of the solar arrays 102, the radiator panels 104 are exposed only in an area adjacent to or surrounding a periphery of the solar array 102, which reduces, but does not prevent will heat loss. Therefore, in order to maintain a sufficient temperature of its components, the spacecraft 100 must expend battery energy to power onboard heaters and generate sufficient heat.

The spacecraft 100 includes batteries that are specifically configured to power the bus section of the spacecraft 100 during the upper stage transfer prior to solar array deployment. However, these batteries are sized for on-orbit requirements and are well undersized to power onboard heaters without recharge during the 8-10 hours required during upper stage transfer (with launch vehicle fairing jettisoned), and the additional post-separation period prior to solar array deployment.

Therefore, because the batteries are undersized to power the onboard heaters and other spacecraft components without being recharged, the spacecraft 100 must utilize solar energy generation in order to meet the energy and heating requirements during the transfer orbit phase. In the case of the rigid solar array 102 shown in FIGS. 1-4, which includes an exposed top panel 106, the spacecraft can generate electrical energy to heat the spacecraft and compensate for the heat loss from the radiator panels 104. Further, the electrical energy generation by the top panel 106 allows the spacecraft 100 to adequately preserve a "positive energy balance," i.e., the electrical energy generated is sufficient to recharge the spacecraft batteries and offset the electrical energy used to operate spacecraft bus equipment and heat the spacecraft 100. Thus, in the context of rigid solar arrays, the spacecraft can generate sufficient solar electrical energy to permit activation of onboard heaters that otherwise place considerable load on the available battery power.

However, in contrast to rigid solar arrays, the use of stowed flexible solar arrays, the solar array is totally enclosed such that there is not an exposed top panel for energy generation prior to deployment of the solar array. Thus, powering the onboard heaters of a spacecraft with flexible solar arrays results in a net energy drain from the batteries because there is no corresponding solar energy generation to offset the drain on the batteries from heaters and bus operation.

It is also noted that in some spacecraft, the radiator panel can be covered by a thermal shield or a Transfer Orbit Thermal Shield (TOTS). TOTS minimizes radiative heat loss from the spacecraft radiator panels 104. TOTS can be used to cover all radiator panel areas, but does not totally restrict heat loss and battery heater drain.

Thus, according to an aspect of at least some of the embodiments disclosed herein is the realization that for spacecraft using flexible solar arrays, there is a need to provide a cost-effective and lightweight system that maintains or generates sufficient heat to protect and preserve components of the spacecraft without creating a net loss of battery power of the spacecraft.

The following description discloses embodiments of a thermal control system that allows the generation or maintenance of heat for the spacecraft without draining electrical energy from the batteries or requiring the generation of solar electrical energy. Accordingly, spacecraft can use flexible solar arrays without the risk of exhausting available battery power and the resultant loss of the spacecraft during the upper stage launch phase.

In some embodiments, the thermal control system can comprise at least one extensible member coupled to the spacecraft and a thermal control panel coupled to the extensible member. The thermal control panel can collect and radiate solar energy toward the spacecraft radiator panels during the upper stage launch phase.

The extensible member can be moved between a collapsed position in which a free end of the extensible member is positioned adjacent to an exposed, heat dissipating area of the spacecraft at a first distance, and an extended position in which the free end is spaced apart from the exposed area at a second distance, greater than the first distance.

The thermal control panel can comprise one or more materials that collects incident solar energy and re-radiates it inboard toward the spacecraft radiator panels. For example, in some embodiments, the thermal control panel can collects between 50%-95% of incident solar energy. The thermal control panel does not need to cover all exposed radiator areas. Rather, the thermal control panel can be designed to generate enough heat for only a smaller area to be covered, thus minimizing cost and mass.

For example, referring now to FIGS. 5-9, a spacecraft 200 can comprise at least one side having an exposed area 202 capable of permitting heat transfer between the spacecraft 200 and the environment, e.g., deep space. The exposed area 202 can be a portion of a side panel 204. The side panel 204 can also be at least partially covered by one or more spacecraft components. As illustrated, the side panel 204 can be at least partially covered by a solar array panel box 210. The solar array panel box 210 can house a solar array, such as a flex solar array.

Accordance with some embodiments, the spacecraft 200 can comprise at least one movable portion or extensible member 208 that is coupled to the spacecraft 200. The extensible member 208 can be configured to move between a collapsed position and an extended position. In accordance with some embodiments, the movable portion or extensible member 208 can be coupled to a thermal control panel or shield 212. The thermal control panel 212 can be actuated by movement of the extensible member 208 such that the thermal control panel 212 can be moved toward or from the spacecraft 200. The thermal control panel 212 can be moved between first and second positions in which the panel 212 is spaced apart from the spacecraft 200 at different distances.

The movable portion or extensible member 208 can be a dedicated component used only for providing movement to the panel or shield 212. However, in some embodiments, the movable portion or extensible member 208 can comprise or be coupled to component of the spacecraft 200 that provides a primary usage other than as an actuating mechanism for the panel or shield 212.

Figure 9:
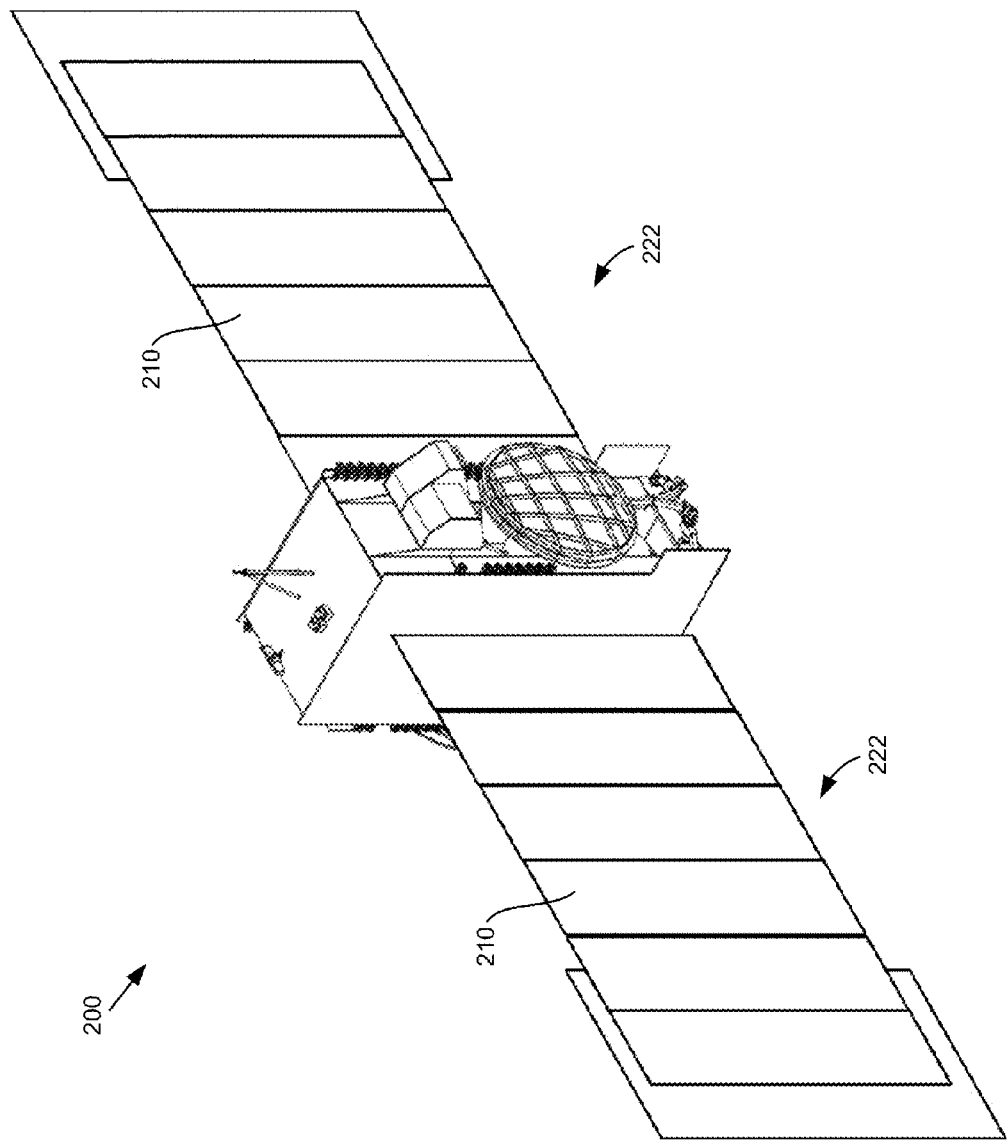
FIG. 9 is a perspective view of the spacecraft of FIG. 5 wherein the flexible solar panel arrays are in an expanded configuration, according to some embodiments.

For example, FIGS. 5-8 illustrate an embodiment in which the extensible member 208 comprises or is coupled to the flex solar array 210, which is shown in the collapsed position 220. FIG. 9 illustrates the flex solar array 210 in the extended position 222. Such embodiments can advantageously enable the flex solar array 210 to provide a secondary function (actuating the panel or shield 212) without increasing the weight, complexity, or possible interference with other components. In accordance with some embodiments, the flex solar array 210 can comprise an accordion stack or accordion-fanfold configuration which can open or expand from the configuration shown in FIGS. 5-8 to the configuration shown in FIG. 9. In some embodiments, the array 210 can comprise a boom or truss-like structure 224 configured to be coupled to the extensible member 208 to extend the array 210 outboard.

In accordance with some embodiments, the panel 212 can be mounted to an existing outer cover or component of a flexible solar array 210. For example, the panel 212 can be coplanar with the top of the outer cover or box containing the flexible solar array. Further, the panel 212 can also be mounted to one or edges of the panels of the solar array.

Accordingly, when the solar array is moved from its collapsed configuration (shown in FIGS. 5-8) toward its deployed position (shown in FIG. 9), the panel 212 can move along with the portion of the array to which the panel 212 is coupled (e.g., the top part of the cover). As such, as shown in FIG. 9, the panel 212 can end up at the very end of the solar array 210, spaced distally from the spacecraft. FIG. 9 illustrates that two or more panels 212 mounted to the solar array 210 can be actuated by the solar array 210 when the solar array is deployed.

Figure 6:
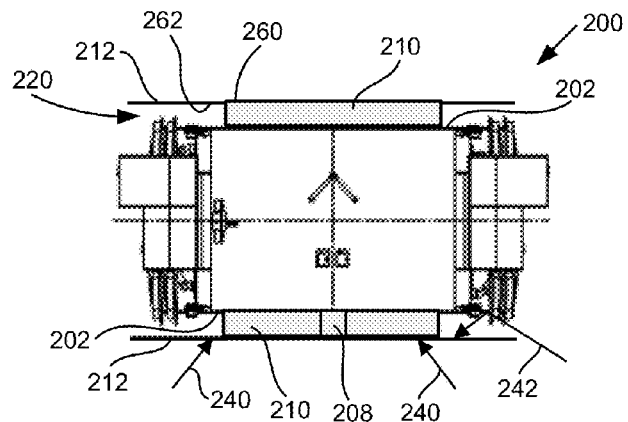
FIG. 6 is a top view of the spacecraft of FIG. 5.
Figures 7, 8:
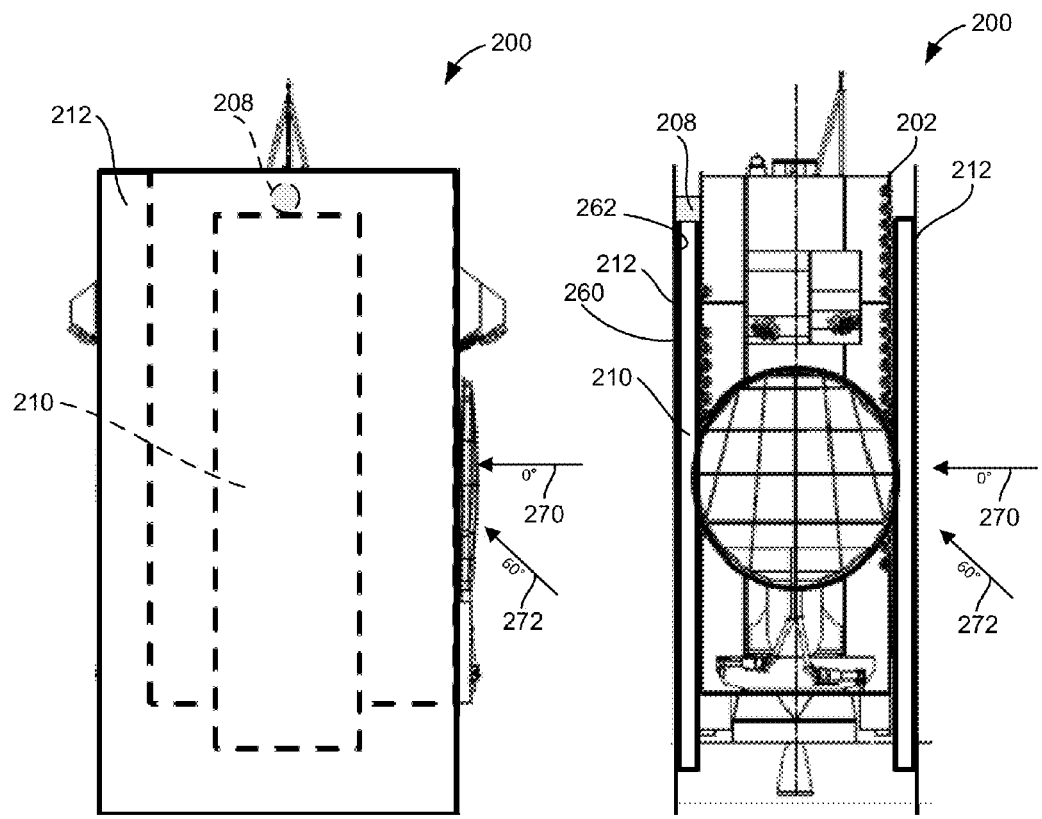
FIG. 7 is a side view of the spacecraft of FIG. 5.
FIG. 8 is an end view of the spacecraft of FIG. 5.

Referring to FIG. 6-8, in the collapsed or stowed configuration, the panel 212 can provide a heat radiation or generation function for the spacecraft 200. FIG. 6 illustrates direct light 240 that is incident upon the panel 212, as well as indirect light 242 that is reflected off of a portion of the spacecraft, such as the underlying side panel 204. This direct and indirect light 240, 242 can be absorbed by the panel 212 to heat the panel 212 to a temperature greater than that if fully exposed to deep space. The panel 212 can be configured to emit or radiate heat toward the underlying side panel 204. This heat radiation or generation can tend to reduce or eliminate the heater draw from the batteries due to heat loss of the spacecraft 200 from the side panel 204.

Referring to FIG. 6-8, in the collapsed or stowed configuration, the panel 212 can be mounted such that it is substantially parallel to an underlying radiator panel 204 of the spacecraft 200. However, in some embodiments, the panel 212 can be positioned skew or nonparallel relative to the underlying panel 204 or other components or portion of the spacecraft 200. In some embodiments, the panel 212 can be substantially planar. However, the panel 212 can also comprise a three-dimensional, nonplanar shape.

When viewed in a side view (e.g., viewed orthogonal relative to the side panel 204), the panel 212 can comprise a periphery that is larger than or extends beyond the periphery of the side panel 204. In some embodiments, all of the periphery of the panel 212 can extend beyond or circumscribe the entire periphery of the side panel 204, thus allowing the panel 212 to be positioned over the entire exposed area 202 of the side panel 204. However, some embodiments can be configured such that only some portion or portions of the panel 212 extend beyond a portion of the side panel 204.

Further, although FIG. 7 illustrates depicts the panel 212 in side view being positioned over the entire exposed area 202 of the side panel 204 of the spacecraft 200, the panel 212 can cover less than the entire exposed area 202. Thus, in some embodiments, the panel 212 can comprise a perimeter, size, or shape that is about equal to the perimeter, size, or shape of the side panel 204. For example, in side view, the panel 212 can cover at least about half of the exposed area 202 or at least about three-fourths of the exposed area 202.

In accordance with some embodiments, the panel 212 can be positioned over the entire side of the flex solar array 210. However, some embodiments can be configured such that only a portion of the side of the flex solar array 210 is covered or attached to the panel 212. The width of each panel of the flex solar array 210 can be between about a one-fifth to about one-half, and from about one-quarter to about one-fourth of the total width of the panel 212.

Further, in some embodiments, the panel 212 can comprise a rigid or deflectable material. The panel 212 can comprise any of a variety of shapes. For example, the periphery of the panel 212 can be rectangular, square, round, or combinations thereof.

As illustrated in FIGS. 6 and 8, the panel 212 can comprise an outboard or first side or surface 260 (e.g., space facing) and an inboard or second side or surface 262 (e.g., spacecraft facing). The first and second sides 260, 262 can have different properties. For example, the first and second sides 260, 262 can have different solar absorptivities and/or infra-red emissivities.

In some embodiments, the first side 260 of the panel 212 can comprise a material of high absorptivity. Further, the first side 260 can comprise a material that has a low emissivity. Additionally, in some embodiments, the first side 260 can comprise a material that has both a high absorptivity and a low emissivity. For example, in some embodiments, the first side 260 can have an absorptivity of at least about 0.40, at least about 0.50, at least about 0.60, at least about 0.70, or at least about 0.80. Further, the first side 260 can have an emissivity of less than 0.30, less than 0.20, less than 0.15, less than 0.10, or less than 0.05. In some embodiments, a ratio of absorbtance to emissivity for the first side can be at least about 2.0, at least about 3.0, at least about 5.0, at least about 8.0, or at least about 11.0.

The first side 260 may be constructed, for example, of Kapton, titanium, nickel, beryllium, and their derivatives, such as titanium foil, bare titanium, anodized titanium, bare beryllium, chromate black nickel, or other advanced solar selective surface material or combinations thereof.

The second side 262 can comprise a material having a high absorptivity. However, the second side 262 can also comprise a material having a high emissivity. In some embodiments, the second side 262 can comprise a material having a high absorptivity and a high emissivity. For example, in some embodiments, the second side 262 can have an absorptivity of at least about 0.70, at least about 0.80, at least about 0.85, at least about 0.90, or at least about 0.95. Furthermore, the second side 262 can have an emissivity of at least about 0.60, at least about 0.70, at least about 0.80, at least about 0.85, or at least about 0.90.

In some embodiments, the second side 262 can comprise a paint (such as a black paint), Kapton tape or film, metal deposits (such as a nickel deposit, a titanium deposit, a chromium deposit, etc.), chemical conversion coating, or their derivatives or combinations thereof. In some embodiments, the second side 262 can be configured to radiate to an underlying high emissivity optical solar reflector radiator coating. With a high emissivity, the second side 262 can radiate heat from absorbed solar rays toward the spacecraft and, particularly, the side panels 204 of the spacecraft 200.

Figure 10:
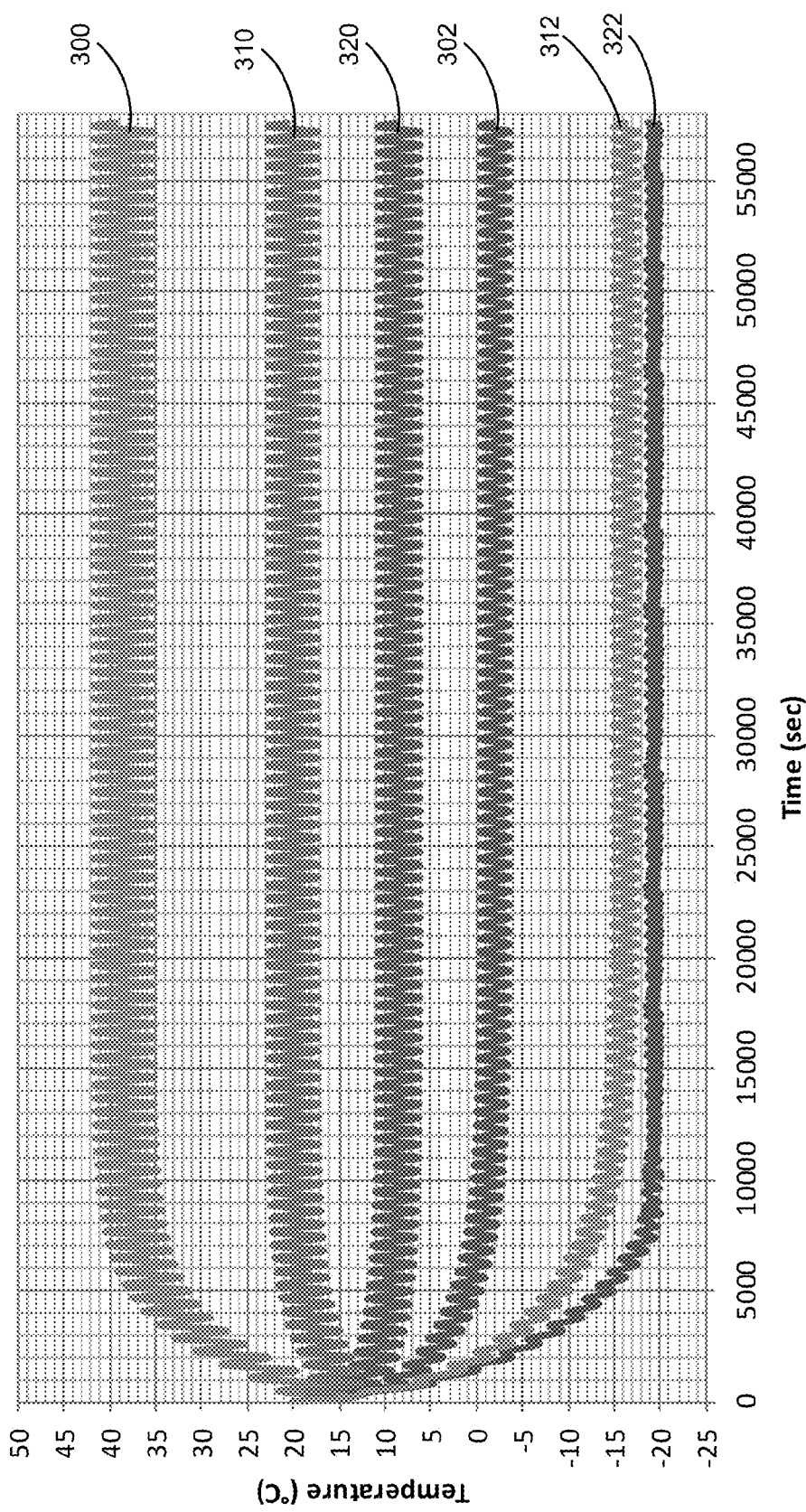
FIG. 10 is a graph illustrating temperatures of thermal control panels having different materials and light incident angles, according to some embodiments.

FIG. 10 depicts a graph having example spacecraft radiator panel temperature profiles for various outboard materials and light incident angles, according to some embodiments. The spacecraft is assumed to be rotating about its nadir-zenith axis in a passive thermal control mode as is typical during transfer orbit. The light incident angles are demonstrated as 0° and 60° relative to the spacecraft rotation axis, as illustrated in FIGS.

7-8. The graph of FIG. 10 illustrates that the panel 212 can achieve various ranges of temperatures over time based on the material and son angle used for the outboard or first side 260 of the panel 212. For example, line 300 illustrates temperature ranges for anodized titanium at a 0° angle. Line 302 illustrates temperature ranges for anodized titanium at a 60° angle. Further, line 310 illustrates temperature ranges for bare titanium at a 0° angle. Line 312 illustrates temperature ranges for bare titanium at a 60° angle. Further, line 320 illustrates temperature ranges for aluminized Kapton at a 0° angle. Line 322 illustrates temperature ranges for aluminized Kapton at a 60° angle. Aluminized Kapton is conventionally used for TOTS configurations and the line 322 results illustrate that heater power is required to maintain required minimum operational temperature limits at the 2.3 hour point, well before the end of transfer orbit, or when solar array deployment occurs. The other two sample solar selective materials represented by lines 300, 302 and 310, 312 are able to maintain panel 202 temperatures above heater range, thus avoiding adverse battery heater drain.

The panel 212 can comprise a thin sheet of material. For example, the panel can have a thickness of between about 2 mm and about 10 mm. In some embodiments, the panel can have a thickness of between about 3 mm and about 6 mm. For example, the panel can have a thickness of between about 3 mm and about 4 mm, about 3 mm and about 5 mm, about 4 mm and about 5 mm, or other such ranges.

In some embodiments, a radiator panel 204 on one side of the spacecraft 200 can be 8' wide by 20' tall, with an undeployed flexible solar array 210 occupying a 3' by 15' area above the radiator panel. Without employing embodiments of the thermal control panels disclosed herein, the exposed portions of the radiator panel 204 to the side and above the undeployed solar array 210 will continue to lose or radiate heat from the systems internal the spacecraft 200. During the transfer orbit, onboard heaters may be activated and drain power from the batteries. The panel 212 can cover the exposed areas (e.g., 2-3' on each side), collects solar energy using the previously described outboard facing surface 260, and re-radiates the heat inward toward the exposed portions 202 of the radiator panels 204 to prevent heat loss and avoid battery electrical drain associated with radiator panel electrical heaters.

An aspect of some embodiments is the realization that duration of transfer orbit may be two or more weeks, whereas, the battery, without electrical recharge capability would last only about 8 hours. Thus, implementation of some embodiments disclosed herein can eliminate the need for heater power usage prior to solar array deployment and extend battery life to >20 hours, thus enabling acceptable operation prior to deployment of flex solar array 210.

In some aspects, the outboard and/or inboard materials may be selected to produce a transfer coefficient of, for example, 0.9. Accordingly, if the sun produces solar energy in the amount of 0.951 watts/square inch, the amount of energy re-radiated may be S=0.8559 watts/square inch (0.9×0.951). Given the rotation of a spacecraft during transfer orbit, the amount of energy absorbed at any one time may be 1/n×S. The total energy produced by the panels 212 can be calculated based on the total area of the panels 212 that cover an exposed area 202, and the value of S.

Analysis confirms that sufficient heat can be generated and re-radiated to the spacecraft 200 for a wide range of solar incidence angles during the typical rotisserie mode encountered between fairing ejection and solar array deployment after upper stage separation. Some embodiments disclosed herein can advantageously be highly productive even for non-flex array missions in reducing overall battery drain and, where TOTS are used, to reduce the overall TOTS size.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

There may be many other ways to implement the subject technology. Various functions and elements described herein may be partitioned differently from those shown without departing from the scope of the subject technology. Various modifications to these aspects will be readily apparent to those skilled in the art, and generic principles defined herein may be applied to other aspects. Thus, many changes and modifications may be made to the subject technology, by one having ordinary skill in the art, without departing from the scope of the subject technology.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A spacecraft, comprising:
    a side having an exposed area capable of permitting heat transfer between the spacecraft and deep space;
    at least one extensible member coupled to the spacecraft, the at least one extensible member being movable between a collapsed position in which a free end of the extensible member is positioned adjacent to the exposed area at a first distance and an extended position in which the free end is spaced apart from the exposed area at a second distance, greater than the first distance; and
    a thermal control panel comprising first and second sides, the first side having an emissivity less than an emissivity of the second side, the panel being coupled to the extensible member free end, the second side facing the exposed area when the extensible member is in the collapsed position;
    wherein in the collapsed position, the panel is configured to absorb ambient light and emit heat toward the exposed area thereby minimizing heat loss from the spacecraft side, and wherein in the extended position, heat transfer from the spacecraft side is not substantially restricted by the panel.

2. The spacecraft of claim 1, wherein the at least one extensible member is coupled to the spacecraft side.

3. The spacecraft of claim 1, wherein the extensible member comprises an extensible flexible solar array, the solar array comprising a top panel having inner and outer surfaces, the inner surface comprising at least one solar cell, wherein the panel is coupled to the outer surface.

4. The spacecraft of claim 1, further comprising a solar device, and wherein in the collapsed configuration, solar cells of the solar device are not exposed to ambient light.

5. The spacecraft of claim 4, wherein the solar device is coupled to the spacecraft side adjacent to the exposed area.

6. The spacecraft of claim 4, wherein the solar device comprises an extensible flexible solar array coupled to the spacecraft side, the thermal control panel being coupled to an outer surface of a top panel of the solar array.

7. The spacecraft of claim 1, wherein in the extended position, the thermal control panel second side faces away from the exposed area.

8. A system for minimizing heat loss of a spacecraft, comprising:
    an extensible member having first and second ends, the extensible member being movable between a collapsed position in which the first and second ends are spaced apart at a first distance and an extended position in which the first and second ends are spaced apart at a second distance, greater than the first distance; and
    a panel attached to the first end and comprising a panel body having first and second sides, the first side having an emissivity lower than an emissivity of the second side, the second side facing the spacecraft when the extensible member is in the collapsed position, the panel being movable from the collapsed position toward the extended position such that the panel is spaced apart from the extensible member second end.

9. The assembly of claim 8, wherein the extensible member comprises at least one extensible solar array, the solar array comprising a top panel having an outer surface and an inner surface, the inner surface comprising at least one solar cell, and wherein the panel is attached to the top panel outer surface.

10. A thermal control panel for a spacecraft, comprising:
    a panel body comprising first and second sides, the first side having an absorptivity of at least 0.50 and an emissivity of less than 0.20, the second side having an absorptivity of at least 0.80 and an emissivity of at least 0.80; and
    a coupling region on the second side for coupling the panel to a spacecraft.

11. The panel of claim 10, wherein the panel body comprises Kapton.

12. The panel of claim 10, wherein the panel body comprises titanium foil.

13. The panel of claim 10, wherein the panel body comprises a material deposited on the first side.

14. The panel of claim 13, wherein the material deposited comprises nickel, titanium, or paint.

15. The panel of claim 10, wherein the first or second side comprises a chemical conversion coating.

16. The panel of claim 10, wherein the panel body comprises at least two materials.

17. The panel of claim 16, wherein the first side comprises bare titanium, anodized titanium, bare beryllium, or chromate black nickel.

18. The panel of claim 16, wherein the second side comprises black paint, Kapton tape, Kapton film, or a chemical conversion coating.

19. The panel of claim 10, further comprising a coupling mechanism attached to the coupling region.

20. The panel of claim 10, wherein the panel comprises a periphery that is substantially rectangular.

* * * * *